United States Patent

Yamaguchi et al.

[15] 3,700,755
[45] Oct. 24, 1972

[54] PROCESS FOR PRODUCING RUBBERY POLYMERS

[72] Inventors: Koretaka Yamaguchi, Kawasaki-shi; Kazuo Toyomoto, Yokohama-shi; Kuniaki Sakamoto, Tokyo, all of Japan

[73] Assignee: Asahi Kasei Kogyo Kabushiki Kaisha, Osaka, Japan

[22] Filed: April 15, 1969

[21] Appl. No.: 816,233

[30] Foreign Application Priority Data

April 27, 1968  Japan ..................... 43/27997

[52] U.S. Cl. ............... 260/879, 260/30.4, 260/33.2, 260/33.6 A, 260/33.6 AO, 260/94.2 T, 260/880
[51] Int. Cl. ........ C08f 19/02, C08f 19/08, C08f 1/58
[58] Field of Search ........ 260/82.1, 879, 880, 94.2 T, 260/94.3, 30.4, 33.2, 33.6 A, 33.6 AO

[56] References Cited

UNITED STATES PATENTS

| | | |
|---|---|---|
| 3,238,173 | 3/1966 | Bailey et al. .............. 260/29.7 |
| 3,317,437 | 5/1967 | Hoffman et al. ............ 252/431 |
| 3,518,238 | 6/1970 | Onishi et al. .............. 260/82.1 |
| 3,591,658 | 7/1971 | Onishi et al. ............... 260/880 |
| 3,595,850 | 7/1971 | Takayanagi et al. ....... 260/94.3 |

FOREIGN PATENTS OR APPLICATIONS 821,971  10/1959  Great Britain ............. 260/879

*Primary Examiner*—Joseph L. Schofer
*Assistant Examiner*—Richard A. Gaither
*Attorney*—Robert D. Flynn

[57] ABSTRACT

Process for producing rubbery polymers having good uniformity, processability and performances which comprises polymerizing one or more conjugated diolefin monomers or copolymerizing a monomeric mixture of conjugated diolefin and monovinyl-substituted aromatic compound in a solution of a polymer of conjugated diolefin or a copolymer of conjugated diolefin and monovinyl-substituted aromatic compound in an inert solvent in the presence of an alfin catalyst.

10 Claims, 1 Drawing Figure

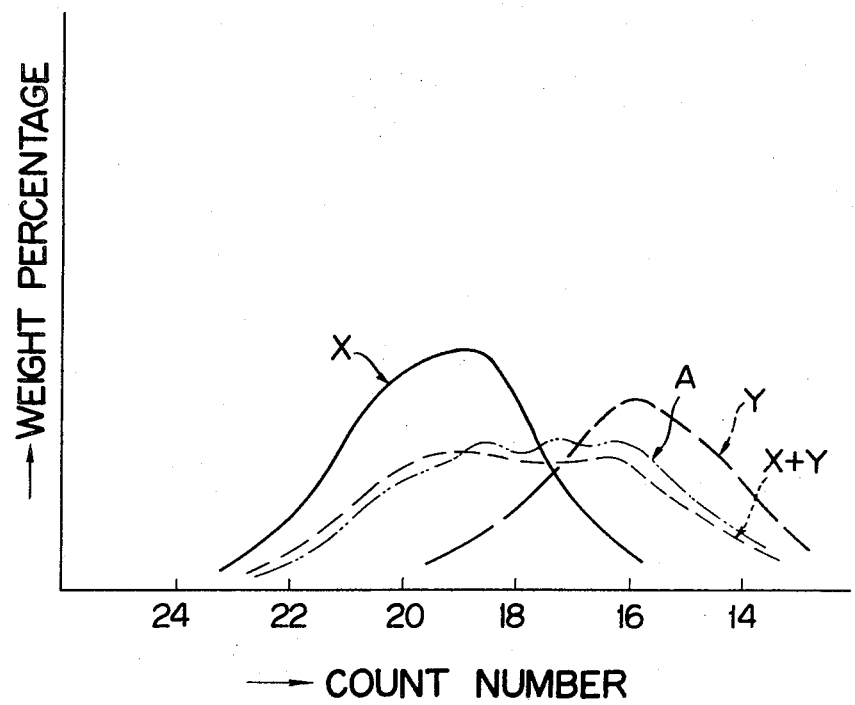

PROCESS FOR PRODUCING RUBBERY POLYMERS

BACKGROUND OF THE INVENTION

It has been well known heretofore that polybutadiene or butadiene/styrene copolymer obtained by using an alfin catalyst in general has poor processability due to its extremely high molecular weight and high degree of branching, not allowing uniform mixing of various fillers therewith with consequential very poor performances of the resulting rubber compositions. Moreover, in the polymerization process, the polymerization mixture is so highly viscous that not only is there required more power for the agitation but also the transportation of the polymer slurry becomes quite difficult.

Relatively recently, U.S. Pat. No. 3,067,187 reported that polymers having relatively low molecular weights may be obtained by carrying out the polymerization using an alfin catalyst and a dihydroaromatic hydrocarbon as a molecular weight controller.

Moreover, the present inventors have found that copolymers having preferable molecular weights may be obtained by copolymerizing conjugated diolefin and monovinyl compounds using an alfin catalyst in a hydrocarbon solvent in the presence of an aliphatic polyether having two or more ether bonds.

By the development of processes for controlling the molecular weight as mentioned above, it has been found that polybutadiene rubber or butadiene/styrene copolymeric rubber obtained by using an alfin catalyst exhibits excellent processability and physical properties.

However, various rubbery materials polymerized by an alfin catalyst have excessively greater green strength than normally required because of a high degree of branching thereof and a minor content of high molecular weight component therein, and they have undesirable drawbacks from the standpoint of processing.

On the other hand, polybutadiene rubber and butadiene/styrene copolymeric rubber produced by solution polymerization using a Ziegler-type or a lithium based catalyst have excellent abrasion resistance and dynamic properties and they are successfully used as material rubbers for the production of tire treads and various industrial goods.

These solution polymerized polybutadiene rubbers and butadiene/styrene copolymeric rubbers, however, have less degree of branching and narrow molecular weight distribution due to the nature of the catalyst employed, and, accordingly, involve less entanglement among the molecules with consequential poor properties with regard to the processability, inter alia, tight roll banding property and extrusion property.

SUMMARY OF THE INVENTION

It is, therefore, an object of the present invention to provide a synthetic rubber having an excellent processability and well-balanced performances without being accompanied by the disadvantages of the prior synthetic rubbers known heretofore.

In accordance with the present invention, the object mentioned above can be accomplished by polymerizing one or more monomers of conjugated diolefins or copolymerizing a monomeric mixture of conjugated diolefin and monovinyl aromatic compound in a solution of a homopolymer of conjugated diolefin or a copolymer of conjugated diolefin and monovinyl aromatic compound in an inert solvent in the presence of an alfin catalyst.

Homopolymers of conjugated diolefin and copolymers of conjugated diolefins and monovinyl-substituted aromatic compounds which may be used in the present invention include, for example, polybutadiene rubber or polyisoprene rubber produced by solution polymerization using a lithium based catalyst; butadiene/styrene copolymeric rubber produced by using a lithium based catalyst; and polybutadiene rubber or polyisoprene rubber obtained by using a Ziegler-type catalyst comprising a transition metal compound and an organoaluminum compound.

One of the preferred embodiments of the present invention comprises polymerizing a conjugated diolefin or copolymerizing a conjugated diolefin and a monovinyl-substituted aromatic compound in an inert solvent using a lithium based catalyst, and, in the resulting solution of the homopolymer or copolymer thus polymerized, polymerizing a conjugated diolefin or copolymerizing a conjugated diolefin and a monovinyl-substituted aromatic compound using an alfin catalyst.

In this instance, the homopolymer or copolymer first polymerized by using a lithium catalyst may be used in the following stage without being deactivated after the polymerization.

In producing a homopolymer or copolymer of a conjugated diolefin using an alfin catalyst in the presence of a conjugated diolefin polymer obtained by using a Ziegler-type catalyst, exactly the same procedures as described above can be followed. In general, however, since Ziegler-type catalyst tends to partly deactivate alfin catalyst, it is preferable that large amounts of alfin catalyst be used or the conjugated diolefin polymer polymerized by using a Ziegler-type catalyst be deactivated beforehand.

Alternatively, the polymerization may be carried out by removing a catalyst residue from a homopolymer of a conjugated diolefin or copolymer of a conjugated diolefin and a monovinyl-substituted aromatic compound having been polymerized following by crumbing, dissolving thus crumbed polymer into a hydrocarbon solvent and adding thereto monomers or monomeric mixture to be polymerized or copolymerized together with an alfin catalyst.

Also, a uniform polymer may be obtained by first polymerizing or copolymerizing a part of a conjugated diolefin or a monomeric mixture of a conjugated diolefin and a monovinyl-substituted aromatic compound using a lithium based catalyst or a Ziegler-type catalyst, and adding to the resulting solution of polymer or copolymer an alfin catalyst to polymerize or copolymerize the remaining unreacted monomers.

In the process of the present invention, solvents inert to an alfin catalyst are used. It is preferable that those solvents are capable of dissolving the polymer or copolymer being present as well as the polymer or copolymer polymerized by the alfin catalyst.

If a solvent only capable of dissolving polymer or copolymer of either the former or the latter referred to above is used, the resulting polymer tends to be nonuniform and no uniform polymer which is the greatest feature of the present invention can be obtained.

Although the type of solvents used in the present invention varies depending upon the types of polymer or copolymer present in the polymerization system and monomers to be polymerized by an alfin catalyst, in general, aliphatic hydrocarbons, aromatic hydrocarbons and ethers are used.

Examples of aliphatic hydrocarbons used in the present invention include aliphatic hydrocarbons such as pentane, hexane and heptane and alicyclic hydrocarbons such as cyclohexane and methyl cyclohexane. Aromatic hydrocarbons used in the present invention include, for example, benzene, toluene and o-, m-, and p-xylenes.

Examples of ethers used in the present invention include tetrahydrofuran and diethyl ether. These solvents exemplified above may be used in admixture of two or more kinds.

In the process of the present invention, these solvents are used, in general, in amounts of 1–20 parts by weight per part by weight of polymer finally obtained.

The alfin catalyst used in the present invention is a mixture of alkali metal sec-alkoxide, alkali metal alkenyl and alkali metal halide obtained by reacting a mol of alkali metal alkyl with 0.5 mol of sec-alcohol such as isopropyl alcohol and 0.5 mol of $\alpha$-olefin such as propylene, said alkali metal alkyl being prepared by reacting a finely powdered alkali metal with halogenated alkyl, e.g. halogenated n-butyl, n-amyl or n-hexyl, gradually in a hydrocarbon solvent with agitation at high speeds. The resulting alfin catalyst will have a composition ratio of alkali metal sec-alkoxide, alkali metal alkenyl and alkali metal halide of 1:1:2 in a molar ratio.

While the reaction affords, if carried out under optimum conditions, a theoretical amount of the reaction product, in general, since the reaction yield is somewhat low, the composition ratio of the resulting catalyst varies somewhat.

The mixture of alkali metal sec-alkoxide, alkali metal alkenyl and alkali metal halide may be obtained without using the process mentioned above. For example, as disclosed in U.S. Pat. No. 3,317,437, it may be prepared by reacting an alkali metal with a sec-alcohol, further reacting excess alkali metal with a hologenated alkyl and still further reacting an $\alpha$-olefin therewith. The resulting catalyst thus obtained will have a composition ratio different from that of catalyst obtained according to the preceding method.

Although, in general, it is preferable from the standpoint of polymerization yield that the composition ratio of alkali metal sec-alkoxide, alkali metal alkenyl and alkali metal halide in the alfin catalyst is in proximity to 1:1:2 or 1:1:1 in a molar ratio, the present invention is not restricted to these ratios. It is, of course, essential that the catalyst contains all these three catalyst components.

The amount of alfin catalyst used in the polymerization or copolymerization according to the present invention is from 1 to 200 m.mol, preferably from 3 to 100 m.mol, of alkali metal alkenyl per 100 g. of monomer or monomeric mixture used. If the amount is less than 1 m.mol, the polymerization yield is degraded, while that exceeding 200 m.mol still induces polymerization reaction but the removal of catalyst in the post-treatment after polymerization becomes difficult causing more catalyst residue to remain in the resulting polymer or copolymer with consequential deterioration in physical properties of the product obtained therefrom.

Alkali metals employed for the alfin catalyst used in the present invention generally designate lithium, sodium, potassium and rubidium. Normally, sodium is used in view of the fact that it affords high polymerization yields.

Secondary alcohols constituting the sec-alkoxide of alkali metals in the alfin catalyst used in the present invention includes, for example, isopropyl alcohol, sec-butyl alcohol, sec-pentyl alcohol, sec-hexyl alcohol and sec-octyl alcohol, and normally isopropyl alcohol is used.

$\alpha$-Olefins constituting the alkali metal alkenyl in the alfin catalyst used in the present invention include, for example, propylene, 1-butene, 1-pentene, 1-hexene, 1-heptene and 1-octene.

Halogens forming the alkali metal halide in the alfin catalyst employed in the present invention include, for example, fluorine, chlorine, bromine and iodine, and normally chlorine is used.

Monomers which may be polymerized or copolymerized by using an alfin catalyst in the present invention are monomeric mixtures of one or more conjugated diolefins and a comonomeric mixture of a conjugated diolefin and a monovinyl-substituted aromatic compound. Typical examples of conjugated diolefins include 1,3-butadiene, isoprene and piperylene and those of monovinyl-substituted aromatic compounds include styrene, o-, m- and p-methyl styrene, o-, m- and p-methoxy styrene and $\alpha$-methyl styrene.

In carrying out the polymerization or copolymerization of the present invention, the amount of homopolymer or copolymer of conjugated diolefin present in the polymerization system depends upon the contemplated use of the polymer finally obtained. For taking the best advantage of the process of this invention, the amount of homopolymer or copolymer of conjugated diolefin present in the polymerization system normally ranges from 5 to 2,000 parts by weight, preferably from 25 to 400 parts by weight, per 100 parts by weight of monomer or monomeric mixture to be polymerized or copolymerized by using an alfin catalyst.

The polymerization or copolymerization according to the present invention is normally carried out at a temperature of from 0° to 180° C., preferably from 20° to 150° C. Although the time required for the polymerization varies depending upon the amount of the polymerization catalyst used, amount and type of the solvent employed, polymerization temperature and amount and type of the molecular weight controller used, in general, it ranges from 10 minutes to 30 hours.

In carrying out the polymerization reaction, the atmosphere of polymerization system should be replaced by an inert gas, e.g. nitrogen, argon or helium. It is also necessary that materials which deactivate the catalyst, such as water and alcohols, should preliminarily be removed from the polymerization system.

When polymerizing a monomer using an alfin catalyst in the process of the present invention, although no molecular weight controller is particularly required, dihydroaromatic hydrocarbons or polyethers having two or more ether bonds may be used for the purpose. The control of the molecular weight may also be accomplished by varying the polymerization conditions such as the polymerization temperature and the ratio of alfin catalyst to monomers.

In accordance with the present invention, there is obtained a uniform polymer having excellent physical properties and processability. As illustrated by Examples hereinafter, the process of the present invention can be practised on a commercial scale easily and the polymers thus obtained are more uniform and far superior in physical properties and processability as compared with other mixing methods known heretofore, e.g. mechanical mixing using a Banbury mixer or the like, or the mixing of respective polymers or copolymers in the form of solutions.

This significant advantage of the present invention is largely attributable to the nature of the alfin catalyst. To wit, unlike other catalysts used for solution polymerization, an alfin catalyst has a grafting ability in addition to the polymerizing ability, i.e. when an alfin catalyst is added together with a monomer in the presence of a polymer or copolymer, the polymer or copolymer present is partly graft-polymerized. Thus, the compatibility between two components of the resultsing polymer or copolymer is greatly improved and, consequently, there is obtained a quite uniform polymer.

BRIEF DESCRIPTION OF THE DRAWING

The accompanying drawing diagrammatically illustrates a molecular weight distribution curve of a polymer obtained according to the present invention measured by a gel-permeation chromatograph as an evidence of the grafting referred to above, together with curves of other polymers and a polymer blend obtained by solution mixing for comparison. Detailed explanation of the diagram will be given in Examples described hereinafter.

Now, in the present invention, polymers are produced in such a manner that they have a Mooney viscosity ranging from 15 to 150. The Mooney viscosity referred to is measured by using a Mooney viscometer and reading the indication after rotating a big rotor for 4 minutes with a pre-heating at 100° C. for 1 minute. If the Mooney viscosity is lower than 15, a part of performances e.g. abrasion resistance, of a rubber product to be obtained from the polymer is degraded, while if it exceeds 150, processability of the polymer such as tight banding property to an open roll mill, as well as the compatibility with fillers are degraded with consequential deterioration in the performances of a rubber product to be obtained therefrom.

The polymers obtained according to the present invention are used for practical purposes either alone or in combination with natural rubber or other synthetic rubbers by incorporating therewith various additives and subsequent vulcanization.

The polymers obtained according to the present invention are preferably used alone; however, for some special purposes, they are blended with natural rubber or other synthetic rubbers. When blending, the polymers obtained according to the present invention should be used in an amount of at least 30 percent by weight based on the weight of the resulting blend.

Fillers actually used may be generally classified into two groups in accordance with their functions, i.e. ones being mainly used for the purpose of improving the performance, particularly the abrasion resistance and hardness of the vulcanized products; various carbon black and finely powdered anhydrous silicic acid having different particle diameters and surface structures are included in this category. Others are mainly used as extenders or assistants for improving the processability of the vulcanized product, and included in this group are calcium carbonate, calcium silicate, calcium carbonate coated with fatty acid, magnesium carbonate, magnesium oxide, zinc oxide, titanium oxide, clay, alumina and talc. In actual use, of course, fillers are suitably selected from these two groups taking the purpose and cost into consideration.

The amount of a filler used is preferably 10–400 parts by weight per 100 parts by weight of the rubber material used.

Although the amount of the filler used is suitably selected depending upon the use of the contemplated rubber product, an amount of less than 10 parts by weight is generally insufficient from the standpoint of performance of the rubber products, while an amount exceeding 400 parts by weight leads to a deterioration in the performance, particularly the abrasion resistance, of the rubber product.

In general, the fillers are mixed mechanically in a Banbury mixer or on an open roll. However, in a particular case, these fillers may be incorporated into the composition in the course of the production thereof before removing water or aliphatic or aromatic hydrocarbon solvent and used as a master batch of fillers obtained by removing water or solvent therefrom.

Compounding agents of importance, other than the fillers mentioned above, are process oils. In general, the process oils used as rubber compounding agents are normally classified in accordance with their "Viscosity Gravity Constant," hereinafter referred to simply as "V.G.C.", given by the following equation:

$$V.G.C. = (G - 0.24 - 0.022 \log (V - 35.5)/0.755)$$

wherein G is the specific gravity of the oil at 60° F., and V is the viscosity of the oil at 210° F. indicated by Saybolt Universal Standard.

Although any process oils having a V.G.C. within the range of 0.790–1.00 may be used for the polymers of this invention, it is preferable that a process oil having a relatively low V.G.C. value be used in a somewhat smaller amount in order to increase the dispersibility and plasticity of the resulting composition, since such a process oil has a poor compatibility with the polymers obtained according to the present invention.

Conversely, a process oil having a greater V.G.C. value may be used in a larger amount for the purpose of improving the plasticity and dispersibility of the resulting composition as well as reducing the cost.

The amount of process oil used for the polymers of this invention is 2–100 parts by weight, preferably 5–75 parts by weight per 100 parts by weight of the polymer of this invention. If the amount of process oil is less than 2 parts by weight, the dispersion of the filler and vulcanization accelerator may not be achieved satisfactorily, while an amount exceeding 100 parts by weight leads to deterioration in the physical properties of the resulting vulcanized rubber product.

The process oil which may be used for the polymer of this invention can be mixed mechanically in a Banbury mixer or on an open roll together with other additives. Alternatively, the process oil may be used in the form of an oil extended polymer which is obtained by mixing the whole or a part of the process oil to be blended with the polymer of this invention or with other synthetic rubbers to be used in combination therewith, such as emulsion-polymerized butadiene/styrene copolymeric rubber, solution-polymerized polybutadiene rubber, emulsion-polymerized polybutadiene rubber or polyisoprene rubber in the form of a latex or a solution in aliphatic or aromatic hydrocarbons, and removing the solvent thereafter to give the oil extended polymer.

In general, in order to obtain a composition containing a large amount of the process oil, it is desirable, from the standpoints of the processing operation and the performance of the resulting product, to blend the process oil into the polymer obtained beforehand using an alfin catalyst in the form of the oil extended polymer.

Besides the fillers and process oils mentioned above, other compounding agents, for example, tackifiers derived from rosin acid, coumarone resin or petroleum resin, vulcanization accelerators, vulcanizers such as sulphur or peroxides, processing assistants such as stearic acid or metal salts thereof, and antioxidants or agents preventing deterioration by ozone, or waxes may be blended with the polymer obtained according to the present invention. These compounding agents are compounded in suitable amounts depending upon the contemplated use of the product.

Rubber products containing the polymers thus obtained according to the present invention render the compounded products particularly excellent strength, tight banding property to an open roll mill, compatibility and extrusion property as well as the performances with regard to abrasion resistance, mechanical properties, dynamic properties and permanent compression set. Thus, the polymers obtained according to the present invention can be successfully used for the production of various rubber products.

Inter alia, the polymers obtained according to the present invention are preferably used for tire treads, i.e. the polymers of the present invention possess a wonderful combination of the excellent performances such as abrasion resistance of a homopolymer or copolymer of conjugated diolefins produced by using a lithium based catalyst or a Ziegler-type catalyst, and the superior processability such as unvulcanized green strength of a homopolymer or copolymer of conjugated diolefins produced by using an alfin catalyst and the polymers of the present invention show unsurpassed properties over those of synthetic rubbers known heretofore.

When using the polymers of the present invention as a material rubber for the production of tire treads, it is preferable that the polymers have a Mooney viscosity ranging from 35 to 150. In this case, the amount of a process oil to be incorporated is preferably from 10 to 75 parts by weight per 100 parts by weight of the polymer. Furthermore, the amount of carbon black to be incorporated either mechanically or in the form of a solution is preferably from 40 to 130 parts by weight per 100 parts by weight of the polymer.

Tire treads produced from a material rubber having the composition as referred to above have quite excellent performances as compared with those of tire treads produced from emulsion-polymerized butadiene/styrene copolymeric rubber or solution-polymerized polybutadiene.

DESCRIPTION OF THE PREFERRED EMBODIMENTS

The present invention will be explained more practically in the following Examples. It should not be construed, however, that these Examples restrict the present invention in any way.

EXAMPLE 1

A. Preparation of an Alfin Catalyst

To a 3-liter capacity three-necked flask provided with an agitator, a funnel and a thermometer which was sufficiently washed, dried and flushed with dried nitrogen were charged 1 liter of n-hexane and 2.0 gram atom of finely divided sodium having a maximum particle size of $2\mu$ in the form of a dispersion in paraffin. The flask was cooled to $-20°$ C. in a dry ice-methanol bath and there was added a mol of n-butyl chloride slowly dropwise.

After continuing the agitation for an hour, to the flask was added 0.5 mol of isopropyl alcohol slowly and after completion of the dropwise addition, the agitation was further continued for another hour.

After completion of the reaction, the temperature was raised to 20° C. and the agitation was carried on for 2 hours. After propylene was purged from the reaction system, the reaction mixture was transferred to a tank the atmosphere of which had been replaced by nitrogen.

The composition of the catalyst thus prepared included 0.5 m.mol/cc. of allyl sodium, 0.5 m.mol/cc. of sodium isopropoxide and 1 m.mol/cc. of sodium chloride.

B. Polymerization

To a stainless steel autoclave which was sufficiently dried and replaced by a high-purity nitrogen was charged a n-hexane solution containing 20 percent by weight of 1,3-butadiene with subsequent addition of 0.05 part by weight of n-butyllithium per 100 parts by weight of 1,3-butadiene and the polymerization was carried out at 60° C. for 4 hours.

To a part of the resulting polymer taken out was added 0.5 part by weight of phenyl-$\beta$-naphthylamine per 100 parts by weight of the polymer and the solvent was removed therefrom. The properties of the resulting polymer were as shown in the following Table 1.

On the other hand, a n-hexane solution of the active polymer obtained above was portioned to several autoclaves, respectively. To thus portioned solutions were added a hexane solution containing 15 percent by weight of 1,3-butadiene, and the alfin catalyst prepared according to procedures as described in the preceding paragraph A., respectively, while adding a molecular weight controller to some of the portions, and the polymerization was carried out under agitation and conditions set forth in the following Table 1.

After completion of the polymerization the polymer solution was poured into a large amount of methanol to decompose the catalyst and, after washing with water, to the polymer was added 0.5 part by weight of phenyl-β-naphthylamine per 100 parts by weight of the polymer as an antioxidant, then, dried in vacuo at 50° C. The results obtained were as shown in the Table 1.

| Vulcanization accelerator CZ[3] | 1.0 |
| Sulfur | 1.8 |

[1] A process oil having a V.G.C. of 0.929 and a specific gravity of 0.986.
[2] Trade name of phenyl-β-naphthylamine.
[3] Trade name of n-cyclohexylbenzothiazyl sulphenamide.

The times required for a thorough mixing of these

TABLE 1

| | Comparative (X) | Example | | | Comparative | | | |
| --- | --- | --- | --- | --- | --- | --- | --- | --- |
| | | (A) | (B) | (C) | (Y) | (Z) | (X+Y)[5] | (X+Z)[6] |
| n-Butyllithium-polymerized polybutadiene (parts by wt.) | 100 | 60 | 60 | 60 | | | | |
| n-Hexane (parts by wt.)[1] | | 467 | 467 | 467 | 567 | 567 | | |
| 1,3-butadiene (parts by wt.) | | 40 | 40 | 40 | 100 | 100 | | |
| Alfin catalyst[2] (mmhm.) | | 20 | 20 | 20 | 20 | 20 | | |
| Molecular weight controller | | (7) | (8) | | | (8) | | |
| Amount of molecular weight controller (mmhm.) | | 45 | 4 | | | 4 | | |
| Polymerization temperature (° C.) | | 90 | 45 | 40 | 90 | 40 | | |
| Polymerization time (hr.) | | 5 | 5 | 5 | 5 | 5 | | |
| Conversion (percent) | | 100 | 99 | 100 | 100 | 100 | | |
| Mooney viscosity (ML$_{1+4}^{100° C.}$) | 35 | 70 | 55 | 55 | >120 | 55 | 95 | 50 |
| DSV[3] | 1.7 | 2.1 | 1.9 | 1.9 | 6.5 | 1.9 | 4.0 | 1.8 |
| Gel content (percent)[4] | 0 | 0.4 | 0.4 | 0 | 19 | 0 | 8 | 0 |

[1] Total sum of n-hexane in lithium-polymerized polybutadiene solution and that in hexane solution of 1,3-butadiene.
[2] Prepared according to the procedures described in paragraph A. in the text. Values are mmols of allyl sodium per 100 g. of 1,3-butadiene.
[3] Inherent viscosity measured in a toluene solution containing 0.2 g./100 ml. of polymer.
[4] Percentage of toluene-insoluble portion per 100 parts by weight of polymer.
[5] and [6] These polymer blends were prepared by first dissolving comparative polymers X, Y, and Z in hexane, respectively, then blending in the form of solution the polymer X with polymer Y and the polymer X with polymer Z in a mixing proportion of 6:4, and removing hexane from the solutions thus blended.
[7] 1,4-dihydronaphthalene.
[8] Diethyleneglycol diethylether.

As can be clearly noted from the Table 1, the polymers obtained according to the present invention have low gel contents, and also their Mooney viscosities are lower than those of polymer blends (X+Y) and (X+Z) prepared by solution blending. It is considered that this stems from the fact that a part of the monomer is grafted with the polymer or copolymer present in the process of the present invention.

Referring to the accompanying drawing which diagrammatically illustrates molecular weight distribution curves of polymers as measured by gel permeation chromatograph, it is clear that the polymer obtained according to the present invention has a molecular weight distribution of so-called "tri-modal" type having three peaks, while the polymer blend obtained by solution blending has that of so-called "bi-modal" type having two peaks.

Now, those three kinds of polymers obtained according to the present invention and, for comparison, the comparative polymer blend obtained by solution blending and homopolymers were mixed in a Banbury mixer in accordance with the recipe shown in the following Table 2.

TABLE 2

Recipe

| Polymer | Part(s) by weight |
| --- | --- |
| Polymer | 100 |
| H.A.F. grade Carbon black | 50 |
| Aromatic process oil[1] | 10 |
| Stearic acid | 1.0 |
| Zinc oxide | 3.0 |
| Antioxidant[2] | 1.0 | polymers, i.e. time elapsed after the addition of carbon black until the mixing torque reached maximum, were as shown in the following Table 3, together with the evaluation of tight roll banding properties.

TABLE 3

| | Mixing time (min.) | Tight roll* banding |
| --- | --- | --- |
| Example polymer (A) | 2.0 | R |
| " (B) | 1.5 | R |
| " (C) | 1.4 | R |
| Comparative polymer (X) | 3.0 | B |
| " (Y) | 12.0 | B |
| " (Z) | 3.5 | F |
| Comparative polymer blend (X+Y) | 6.5 | B |
| " (X+Z) | 3.5 | F |

*Evaluated the tight roll banding property at 60° C. on a 8' open roll having a roll rotation of 1:1.1 with a roll gap of 4 mm. on the following basis:
"R" stands for "Rolling" showing a smooth banding of polymers to the roll; "F" stands for "Folding" which means banding of a part of polymers to the roll but only quite unstably, and "B" stands for "Bagging" meaning no banding at all.

As can be noted from the Table 3, the tight roll banding properties of the polymers obtained according to the present invention are quite superior to those of comparative polymers or polymer blends.

Next, green strengths of unvulcanized compositions obtained from these eight different kinds of polymers or polymer blends were measured with results as tabulated in the following Table 4 which also shows extrusion characteristics of these compositions.

TABLE 4

| | Green properties[1] | | Extrusion characteristics[2] | | |
| --- | --- | --- | --- | --- | --- |
| | Green strength | Elongation | Extrudability | Extrudate appearance | Die swelling |

|  | (kg/cm) | (%) | (g/mm) | ance[3] | (%) |
|---|---|---|---|---|---|
| Composition of |  |  |  |  |  |
| Example polymer (A) | 7.5 | 150 | 13.0 | 5 | 53 |
| " (B) | 6.0 | 150 | 12.5 | 5 | 56 |
| " (C) | 6.0 | 180 | 12.5 | 5 | 49 |
| Composition of Comparative polymer |  |  |  |  |  |
| (X) | 3.5 | 200 | 2.0 | 3 | 45 |
| " (Y) | 9.5 | 60 | 15.0 | 2 | 95 |
| Composition of Comparative polymer blend |  |  |  |  |  |
| (X+Y) | 4.0 | 150 | 7.5 | 4 | 75 |
| " (X+Z) | 4.5 | 210 | 8.0 | 4 | 69 |

[1] Measured with a pulling speed of 1,000 mm/min.
[2] Extruded by using a Brabender-type extruder. Testing conditions included a temperature of 95° C., a screw rotation speed of 46 r.p.m. and a nozzle diameter of 4 mm.
[3] 5 is the maximum value assigned.

Table 4 clearly shows that the compositions prepared from the polymers of the present invention have excellent green strength and extrusion characteristics as well as well-balanced processability.

Now, these compositions were press-vulcanized at 141° C. for 30 minutes and physical properties of the resulting vulcanized rubbers were measured with the results as tabulated in the following Table 5.

TABLE 5

|  | Composition of example polymer | | | Composition of comparative polymer | | Composition of comparative polymer blend | |
|---|---|---|---|---|---|---|---|
|  | (A) | (B) | (C) | (X) | (Z) | (X+Y) | (X+Z) |
| Tensile strength (kg./cm.²) [1] | 168 | 175 | 180 | 141 | 146 | 140 | 141 |
| 300% modulus (kg./cm.²) [1] | 99 | 102 | 105 | 85 | 95 | 90 | 91 |
| Elongation (percent) [1] | 600 | 650 | 680 | 500 | 430 | 450 | 450 |
| Tear strength (kg./cm.) [1][2] | 45 | 48 | 48 | 30 | 31 | 31 | 32 |
| Hardness [1] | 60 | 61 | 60 | 63 | 60 | 61 | 60 |
| Resilience (percent) [3] | 52 | 51 | 50 | 51 | 46 | 46 | 45 |
| ΔT (° C.) | 29 | 27 | 27 | 29 | 33 | 35 | 33 |
| Abrasion index [4] | 125 | 125 | 129 | 100 | 98 | 90 | 98 |

[1] Measured according to JIS K-6301.
[2] Measured with JIS-B type test pieces.
[3] Measured by Dunlop tripsometer.
[4] Measured by Goodrich flexometer.
[5] Measured by Akron abrasion tester. Still load, 2 kg. Slip angle, 15°. The abrasion resistance of the composition of comparative polymer (X) was indexed as 100.

As can be noted from the Table, vulcanized products obtained from the compositions of the polymers of the present invention have excellent physical properties in practically all respect, inter alia, in dynamic properties, tensile strength and abrasion resistance.

EXAMPLE 2

To a stainless steel autoclave the atmosphere of which was completely replaced by a high-purity nitrogen was charged n-hexane solution containing 15 percent by weight of 1,3-butadiene with subsequent addition of 0.05 part by weight of n-butyllithium per 100 parts by weight of 1,3-butadiene and the polymerization was carried out at 60° C. for 4 hours.

The resulting n-hexane solution of active polymer was portioned in a predetermined amount of several autoclaves and to each portioned solution was added a n-hexane solution containing a monomeric mixture of 1,3-butadiene and styrene in a weight ration of 75:25, together with the alfin catalyst prepared in Example 1 and the copolymerization was carried out with agitation under conditions set forth in the following Table 6.

After completion of the reaction, the polymer solution was poured into a large amount of methanol to decompose the catalyst and, after a thorough washing with water, to the polymer was added 0.5 part by weight of phenyl-β-naphthylamine per 100 parts by weight of the polymer as an antioxidant, then, dried in vacuo at 50° C. The results are also shown in the Table 6.

TABLE 6

|  | Example | | | Comparative | | | | |
|---|---|---|---|---|---|---|---|---|
|  | (A) | (B) | (C) | (D) | (E) | (F)[1] | (G)[2] | (H)[3] |
| Butyllithium-polymerized polybutadiene (parts by wt.) | 30 | 50 | 60 | 100 |  |  |  |  |
| n-Hexane (parts by wt.) | 667 | 667 | 667 |  | 667 |  |  |  |
| 1,3-butadiene (parts by wt.) | 52.5 | 37.5 | 30 |  | 75 |  |  |  |
| Styrene (parts by wt.) | 17.5 | 12.5 | 10 |  | 25 |  |  |  |
| Alfin catalyst (mmhm.) | 20 | 20 | 20 |  | 20 |  |  |  |
| Polymerization temperature (° C.) | 70 | 70 | 70 |  | 70 |  |  |  |
| Polymerization time (hr.) | 4 | 4 | 4 |  | 4 |  |  |  |
| Conversion (percent) | 100 | 100 | 100 |  | 100 |  |  |  |
| Mooney viscosity | 45 | 55 | 65 | 35 | 75 | 48 | 59 | 70 |
| Bonded styrene [4] | 17.5 | 12.5 | 10.0 |  | 25.0 | 17.5 | 12.5 | 10.0 |
| Block styrene [5] | 0 | 0 | 0 |  | 0 | 0 | 0 | 0 |
| Gel content (percent) | 0 | 0 | 0 | 0 | 0 | 0 | 0 | 0 |

[1] Prepared by blending the polymers of Comparative Examples (D) and (F) on an open roll in a ratio of 30:70.
[2] Prepared by blending the polymers of Comparative Examples (D) and (F) on an open roll in a ratio of 50:50.
[3] Prepared by blending the polymers of Comparative Examples (D) and (F) on an open roll in a ratio of 60:40.
[4] Amount of bonded styrene in the polymer in terms of percent by weight calculated from refractive index.
[5] Determined as follows:

Next, these eight different polymers were compounded according to the recipe shown in the following Table 7 by using a B-type Banbury mixer:

TABLE 7

Recipe

| | Part(s) by weight |
|---|---|
| Polymer | 100 |
| H.A.F. grade Carbon Black | 90 |
| Aromatic process oil[1] | 50 |
| Zinc oxide | 5 |
| Stearic acid | 2 |
| Antioxidant D | 1.0 |
| Vulcanization accelerator NS[2] | 1.2 |
| Sulfur | 1.6 |
| Paraffin wax | 1.0 |

[1] A process oil having a V.G.C. of 0.951 and a specific gravity of 0.939.
[2] Trade name of n-oxydiethyleneglycol-2-benzothiazyl sulphenamide.

The times required for a thorough mixing of these eight different polymers with compounding agents and tight roll banding properties were as shown in the following Table 8.

TABLE 8

| | Mixing time (min.) | Tight roll* banding |
|---|---|---|
| Example polymer (A) | 1.5 | R |
| " (B) | 1.3 | R |
| " (C) | 1.5 | R |
| Comparative polymer (D) | 3.0 | B |
| " (E) | 3.7 | B |
| Comparative polymer blend (F) | 3.5 | F |
| " (G) | 3.3 | F |
| " (H) | 3.5 | B |

* Evaluated on the same basis as in Example 1.

Table 8 clearly shows that polymers obtained according to the present invention require shorter mixing time than any of the comparative polymers and, in addition, have superior tight roll banding properties thereover.

Next, the resulting compositions were pressvulcanized at 145° C. for 60 minutes and physical properties of the resulting vulcanized products were measured with results as shown in the following Table 9.

As can be clearly noted from the Table 9, the polymers obtained according to the present invention are superior in tensile strength, tear strength and abrasion resistance to the comparative polymers or polymer blends obtained by mechanical blending.

TABLE 9

| | Vulcanized product of example polymer | | | Vulcanized product of comparative polymer | | | | |
|---|---|---|---|---|---|---|---|---|
| | (A) | (B) | (C) | (D) | (E) | (F) | (G) | (H) |
| Tensile strength (kg./cm.²) | 220 | 215 | 200 | 138 | 185 | 170 | 165 | 155 |
| 300% modulus (kg./cm.²) | 108 | 105 | 105 | 85 | 87 | 85 | 87 | 83 |
| Elongation (percent) | 590 | 570 | 540 | 550 | 470 | 490 | 470 | 480 |
| Tear strength (kg./cm.) | 46 | 47 | 46 | 31 | 31 | 32 | 32 | 33 |
| Hardness | 62 | 61 | 61 | 60 | 60 | 59 | 60 | 60 |
| Resilience (percent) | 43 | 45 | 47 | 50 | 34 | 39 | 40 | 40 |
| ΔT (°C.) | 30 | 30 | 29 | 29 | 37 | 36 | 36 | 35 |
| Abrasion index [1] | 135 | 138 | 145 | | | 100 | 102 | 105 |

[1] Abrasion resistance of the comparative polymer (F) was indexed as 100.

Now, polymers of (A) – (C) and (F) – (H) referred to above and, for comparison, an emulsion-polymerized styrene/butadiene copolymeric rubber (SBR-1712) were compounded in a No.11 Banbury mixer according to the recipe shown in the Table 7, respectively, and the resulting compositions were extruded by a factory extruder into the shape of a tire tread. Each respective extrudate was applied with a raw tire having a tire size of 6.40 – 14 including a carcus part consisting of a compounded emulsion-polymerized styrene/butadiene copolymer (SBR-1712) and nylon tire cord and vulcanized at a standard vulcanizing temperature to obtain a product tire.

These seven different kinds of tires thus obtained were subjected to tests under actual running conditions to measure heat generated inside the tire, abrasion resistance and crack growth. The results obtained were as tabulated in the following Table 10.

TABLE 10

| | Heat generated[1] inside the tire (°C) | Abrasion[2] resistance of the tire | Crack[3] growth (mm.) |
|---|---|---|---|
| Composition of Example of polymer (A) | 60 | 145 | 4 |
| " (B) | 61 | 150 | 3 |
| " (C) | 59 | 150 | 4 |
| Composition of Comparative polymer (F) | 81 | 110 | 11 |
| " (G) | 79 | 115 | 12 |
| " (H) | 77 | 118 | 14 |
| Composition of emulsion-polymerized SBR-1712 | 83 | 100 | 16 |

[1] Temperature difference between atmospheric temperature and temperature inside the tire tube as measured by thermocouple at a running speed of 100 km/hr.
[2] Abrasion resistance of emulsion-polymerized SBR-1712 was indexed as 100.
[3] A cut of 1 mm. length was nicked at the grooved portion of tire tread and growth in length of the cut was measured after the total running of 10,000 km.

Table 10 clearly shows that the compositions containing the polymers obtained according to the present invention exhibit excellent abrasion resistance, and resistances to heat generation and cracking. Inter alia, it is noteworthy that the compositions containing the polymers obtained according to the present invention show remarkably high values with regard to the abrasion resistance and resistance to cracking as compared with the composition containing a polymer blend obtained by blending mechanically on an open roll a polybutadiene produced by using a butyllithium catalyst with a butadiene/styrene copolymer produced by using an alfin catalyst.

EXAMPLE 3

To an autoclave the atmosphere of which was replaced by nitrogen was charged under pressure with a benzene solution containing 20 percent by weight of 1,3-butadiene and there were further added 0.25 m.mol of cobalt (III) acetylacetonate per 100 g. of butadiene, 0.2 mol of diethylaluminum chloride and 1 m.mol of water, and the polymerization was carried out at 60° C. for 12 hours.

After completion of the polymerization, to the reaction mixture was added a hexane solution containing 20 percent by weight of a monomeric mixture consisting of 1,3-butadiene and isoprene in a weight ratio of 85:15, together with an alfin catalyst having the same composition as used in Example 1 and the polymerization was carried out. The polymerization conditions and the results obtained were as shown in the following Table 11. The resulting polymer solution was washed to remove the catalyst therefrom and subsequently dried according to the same procedures as described in Example 1.

TABLE 11

|  | Example | | Comparative | | | |
| --- | --- | --- | --- | --- | --- | --- |
|  | (A) | (B) | (C) | (D) | (E)[1] | (F)[2] |
| Polybutadiene produced by a Ziegler-type catalyst (parts by wt.) | 60 | 40 | 100 | | | |
| Benzene (parts by wt.) | 240 | 160 | | | | |
| Hexane (parts by wt.) | 160 | 240 | | 400 | | |
| 1,3-butadiene (parts by wt.) | 34 | 51 | | 85 | | |
| Isoprene (parts by wt.) | 6 | 9 | | 15 | | |
| Alfin catalyst (mmhm.) | 45 | 45 | | 45 | | |
| Polymerization temperature (°C.) | 85 | 85 | | 85 | | |
| Polymerization time (hr.) | 6 | 6 | | 6 | | |
| Conversion (percent) | 98 | 98 | | 97 | | |
| Mooney viscosity ($ML_{1+4}$ 100°C.) | 51 | 52 | 48 | 49 | 50 | 51 |
| Gel content (percent) | 0.05 | 0.05 | 0.05 | 0.3 | 0.1 | 0.1 |

[1] Prepared by redissolving the polymers of Comparative Examples C and D in benzene and blending them in the form of a solution in such a proportion that the ratio of polymer C to polymer D becomes 60:40.
[2] Prepared by redissolving the polymers of Comparatives C and D in benzene and blending them in the form of a solution in such a proportion that the ratio of polymer C to polymer D becomes 40:60.

As can be noted from the Table 11, in accordance with the present invention, a polymer can be obtained by first polymerizing a monomer using a Ziegler-type catalyst, then further polymerizing a monomer or monomeric mixture using an alfin catalyst in the presence of the first obtained polymer solution.

Now, these six different polymers were mixed with compounding agents according to the recipe shown in Table 12 using a Banbury mixer and vulcanized at 140° C. for 30 minutes. The following Table 13 shows physical properties of the resulting vulcanized products.

TABLE 12

Recipe

| Polymer | Part(s) by weight |
| --- | --- |
| Polymer | 100 |
| H.A.F. grade carbon black | 50 |
| Aromatic process oil[1] | 10 |
| Zinc oxide | 2 |
| Stearic acid | 1.0 |
| Antioxidant D | 1.0 |
| Vulcanization accelerator CZ | 1.0 |
| Sulfur | 1.7 |

[1] V.G.C.-0.932, Specific gravity-0.990

TABLE 13

|  | Vulcanized product of Example polymer | | Vulcanized product of comparative polymer | | Vulcanized product of comparative polymer blend | |
| --- | --- | --- | --- | --- | --- | --- |
|  | (A) | (B) | (C) | (D) | (E) | (F) |
| Tensile strength (kg./cm.²) | 215 | 225 | 180 | 200 | 190 | 192 |
| 300% modulus (kg./cm.²) | 115 | 119 | 105 | 105 | 105 | 110 |
| Elongation (percent) | 650 | 650 | 670 | 650 | 650 | 620 |
| Tear strength (kg./cm.) | 43 | 45 | 32 | 38 | 34 | 33 |
| Hardness | 61 | 61 | 63 | 60 | 60 | 61 |
| Resilience (percent) | 46 | 43 | 55 | 40 | 42 | 43 |
| Δ T (° C.) | 30 | 30 | 31 | 36 | 33 | 34 |
| Abrasion index [1] | 135 | 137 | 130 | 100 | 95 | 96 |

[1] Abrasion resistance of the comparative polymer D (cis-polybutadiene) was indexed as 100.

EXAMPLE 4

There were prepared n-hexane solutions containing 10 percent by weight of a high-cis polybutadiene polymerized by using triethylaluminum and titanium tetraiodide; a high-cis polyisoprene polymerized by using triisobutylaluminum and titanium tetrachloride; and a butadiene/styrene random copolymer produced by solution-polymerization using butyllithium catalyst and tetrahydrofuran as a random polymerization agent, respectively.

To an autoclave the atmosphere of which was replaced by nitrogen was charged the polymer solution prepared above, respectively, and there was added to the autoclave 1,3-butadiene in such an amount that the weight ratio thereof to the polymer being present becomes 1:1, together with 25 m.mol of an alfin catalyst calculated as allyl sodium per 100 g. of 1,3-butadiene, said alfin catalyst being prepared according to the same procedures as described in Example 1, and the polymerization was carried out at 40° C. In all cases, the conversion of higher than 99.5 percent was reached within 2 hours of polymerization reaction.

The results are tabulated in the following Table 14 and it can be noted therefrom that the resulting polymers have properties useful as synthetic rubbers for general purposes.

TABLE 14

|  | Polymer present | | |
| --- | --- | --- | --- |
|  | Cis-poly-butadiene | Cis-poly-isoprene | Solution-polymerized butadiene/styrene copolymer |
| Mooney viscosity ($ML_{1+4}$ ) | 45 | 60 | 45 |
| Amount (parts by wt.) | 100 | 100 | 100 |
| Hexane (parts by wt.) | 900 | 900 | 900 |
| 1,3-butadiene (parts by wt.) | 100 | 100 | 100 |
| Alfin catalyst used (mmhm) | 25 | 25 | 25 |
| Polymerization Temperature (°C) | 40 | 40 | 40 |
| Polymerization Time (hr.) | 2 | 2 | 2 |
| Conversion (%) | 99.9 | 99.8 | 99.9 |
| Mooney viscosity ($ML_{1+4}$ ) | 65 | 75 | 55 |
| Gel content (%) | 0.05 | 0.04 | 0.01 |

EXAMPLE 5

To an autoclave the atmosphere of which was completely replaced by nitrogen was charged a tetrahydrofuran solution containing 20 percent by weight of 1,3-butadiene and there were further added to the autoclave 0.04 part by weight of sec-butyllithium and the polymerization was carried out at 60° C. for an hour. At this point, the conversion was determined by gas-chromatograph and it was found to be 55 percent.

Subsequently, 20 m.mol of an alfin catalyst prepared according to the same procedures as described in Example 1 calculated as allyl sodium was added to the unreacted monomer per 100 g. thereof. Soon after the addition, the polymerization proceeded rapidly and the conversion reached 99.5 percent within 30 minutes. The resulting polymer had a Mooney viscosity of 45 and a gel content of 0.05 percent.

It will be understood from the above than in accordance with the process of the present invention, there is obtained a uniform polymer having a low gel content, without using any molecular weight controllers.

EXAMPLE 6

To an autoclave the atmosphere of which was replaced by nitrogen was charged a toluene solution containing 10 percent by weight of a polybutadiene having a Mooney viscosity of 50, polymerized by a lithium based catalyst and there were further added to the autoclave 80 parts by weight of a monomeric mixture consisting of 1,3-butadiene and p-methyl styrene in a weight ratio of 75:25 per 100 parts by weight of polybutadiene present, and 20 m.mol of an alfin catalyst prepared according to the same procedures as described in Example 1 calculated as allyl sodium per 100 g. of the monomeric mixture and the polymerization was carried out at 45° C. for 4 hours.

As a result, there was obtained a polymer having a Mooney viscosity of 45 and a gel content of 0.02 percent.

As described above, in accordance with the present invention, there is obtained a polymer having a low gel content and a controlled molecular weight even when a mixture of 1,3-butadiene and p-methyl styrene is used as a monomer.

We claim:

1. Process for producing a uniform partially graft-polymerized rubbery polymer which comprises polymerizing one or more conjugated diolefin monomers or copolymerizing a monomeric mixture of a conjugated diolefin and a monovinyl-substituted aromatic compound in a solution of a homopolymer (A) of conjugated diolefins or a copolymer (B) of conjugated diolefins and monovinyl-substituted aromatic compounds in an inert solvent in the presence of an alfin catalyst, the amount of the alkali metal alkenyl component of the said alfin catalyst being from 1 to 200 m.mol per 100 g. of monomer or monomeric mixture used and said homopolymer (A) and said copolymer (B) being prepared by solution polymerization in the presence of a lithium based catalyst or a Ziegler catalyst.

2. Process according to claim 1 wherein the amount of said polymer of conjugated diolefins or said copolymer of conjugated diolefins and monovinyl-substituted aromatic compounds being present ranges from 5 to 2,000 parts by weight per 100 parts by weight of said one or more conjugated diolefin monomers or said monomeric mixture of a conjugated diolefin and a monovinyl-substituted aromatic compound to be polymerized or copolymerized by said alfin catalyst.

3. Process according to claim 1 wherein said polymer of conjugated diolefins or said copolymer of conjugated diolefins and monovinyl-substituted aromatic compounds being present is a member selected from the group consisting of polybutadiene, polyisoprene and butadiene/styrene copolymer, all these being solution-polymerized by a lithium based catalyst.

4. Process according to claim 1 wherein said polymer of conjugated diolefins being present is a member selected from the group consisting of polybutadiene and polyisoprene, all these being solution-polymerized by a Ziegler-type catalyst.

5. Process according to claim 1 wherein said one or more conjugated diolefin monomers to be polymerized by said alfin catalyst is at least one member selected from the group consisting of 1,3-butadiene, isoprene and piperylene.

6. Process according to claim 1 wherein said monomeric mixture of conjugated diolefins and monovinyl-substituted aromatic compounds being consisted of 1,3-butadiene and a member selected from the group consisting of styrene, o-, m-, and p-methyl styrene; o-, m-, and p-methoxy styrene; and α-methyl styrene.

7. Process according to claim 1 wherein said inert solvent is a member selected from the group consisting of straight-chain aliphatic hydrocarbons, alicyclic hydrocarbons, aromatic hydrocarbons and ethers, capable of dissolving both of said homopolymer (A) of conjugated diolefins or said copolymer (B) of conjugated diolefins and monovinyl-substituted aromatic compounds and the resulting polymer of conjugated diolefins or the resulting copolymer of conjugated diolefins and monovinyl-substituted aromatic compounds.

8. Process according to claim 7 wherein said aliphatic or alicyclic hydrocarbon is a member selected from the group consisting of pentane, hexane, heptane, cyclohexane and methyl cyclohexane.

9. Processing according to claim 7 wherein said aromatic hydrocarbon is at least a member selected from the group consisting of benzene, toluene, o-, m-, and p-xylene.

10. Process according to claim 7 wherein said ether is at least a member selected from the group consisting of tetrahydrofuran and diethyl ether.

* * * * *

UNITED STATES PATENT OFFICE
CERTIFICATE OF CORRECTION

Patent No. 3,700,755          Dated October 24, 1972

Inventor(s) KORETAKA YAMAGUCHI et al

It is certified that error appears in the above-identified patent and that said Letters Patent are hereby corrected as shown below:

Columns 11 and 12 - Table 6 - at bottom of Table, Footnote 5, after "follows:", add the following:

"In 100 parts by weight of carbon tetrachloride was dissolved 2 parts by weight of the polymer and to the resulting solution were added 10 parts by weight of tertiary-butyl hydroperoxide and further 0.02 part by weight of osmium tetraoxide and heated at 80°C. for 15 minutes to completely destroy and decompose double bonds in the molecules of butadiene/styrene copolymer.

"To the solution thus obtained was added a large amount of methanol to give block styrene as precipitates which were filtered off, dried in vacuo and weighed to determine the amount of block styrene in terms of percent by weight based on the weight of the polymer."

Signed and sealed this 18th day of December 1973.

(SEAL)
Attest:

EDWARD M. FLETCHER, JR.          RENE D. TEGTMEYER
Attesting Officer                 Acting Commissioner of Patents